United States Patent
Bates et al.

(10) Patent No.: US 6,517,605 B1
(45) Date of Patent: Feb. 11, 2003

(54) START-UP PROCEDURE FOR DIRECT SMELTING PROCESS

(75) Inventors: Cecil Peter Bates, Mt. Pleasant (AU); Peter Damian Burke, Winthrop (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/611,514

(22) Filed: Jul. 7, 2000

(30) Foreign Application Priority Data

Jul. 9, 1999 (AU) .............................................. PQ1522

(51) Int. Cl.$^7$ ............................. C21C 5/30; C21C 7/076
(52) U.S. Cl. ............................. 75/531; 75/548; 75/558; 75/560
(58) Field of Search ........................... 75/531, 548, 560, 75/558

(56) References Cited

U.S. PATENT DOCUMENTS

| | | |
|---|---|---|
| 2,647,045 A | 7/1953 | Rummel |
| 3,463,472 A | 8/1969 | Worner |
| 3,844,770 A | 10/1974 | Nixon |
| 3,845,190 A | 10/1974 | Yosim et al. |
| 3,888,194 A | 6/1975 | Kishigami et al. |
| 3,890,908 A | 6/1975 | von Klenck et al. |
| 3,894,497 A | 7/1975 | Helke et al. |
| 4,007,034 A | 2/1977 | Hartwig et al. |
| 4,053,301 A | 10/1977 | Stephens, Jr. |
| 4,145,396 A | 3/1979 | Grantham |
| 4,177,063 A | 12/1979 | Dickson |
| 4,207,060 A | 6/1980 | Zangs |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |

(List continued on next page.)

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |
| AU | B-26831/88 | 7/1989 |
| AU | B-28802/89 | 8/1989 |

(List continued on next page.)

OTHER PUBLICATIONS

U.S. patent application Ser. No. 09/550,421, Dry, filed Apr. 17, 2000.

U.S. patent application Ser. No. 09/160,913, Dry, filed Sep. 25, 1998.

U.S. patent application Ser. No. 09/331,277, Jai, filed Jun. 17, 1999.

(List continued on next page.)

Primary Examiner—Roy King
Assistant Examiner—Tima McGuthry-Banks
(74) Attorney, Agent, or Firm—Merchant & Gould, P.C.

(57) ABSTRACT

A procedure for starting up a direct smelting process for producing iron from a metalliferous feed material in a metallurgical vessel is disclosed. The vessel is of the type which includes a plurality of feed material injection lances/tuyeres (11, 13). The start-up procedure includes the steps of:

(a) preheating the vessel;
(b) supplying a charge of molten iron to the vessel and forming a molten bath in the vessel,
(c) supplying carbonaceous material and flux to the molten bath and injecting oxygen-containing gas through one or more than one feed material injection lance/tuyere and combusting carbon and bath derived gas (if present) and thereby heating the molten bath and generating slag; and
(d) suppling metalliferous feed material to the vessel while continuing supply of carbonaceous material and flux and injection of oxygen-containing gas and smelting metalliferous feed material and producing molten iron and thereby completing the start-up procedure.

24 Claims, 1 Drawing Sheet

U.S. PATENT DOCUMENTS

| | | | |
|---|---|---|---|
| 4,447,262 A | 5/1984 | Gay et al. | |
| 4,455,017 A | 6/1984 | Wunsche | |
| 4,468,298 A | 8/1984 | Byrne et al. | |
| 4,468,299 A | 8/1984 | Byrne et al. | |
| 4,468,300 A | 8/1984 | Byrne et al. | |
| 4,481,891 A | 11/1984 | Takeshita et al. | |
| 4,497,656 A | * 2/1985 | Robert | 75/530 |
| 4,504,043 A | 3/1985 | Yamaoka et al. | |
| 4,511,396 A | 4/1985 | Nixon | |
| 4,565,574 A | 1/1986 | Katayama et al. | |
| 4,566,904 A | 1/1986 | von Bogdandy et al. | |
| 4,572,482 A | 2/1986 | Bedell | |
| 4,574,714 A | 3/1986 | Bach et al. | |
| 4,602,574 A | 7/1986 | Bach et al. | |
| 4,664,618 A | 5/1987 | Gitman | |
| 4,681,599 A | 7/1987 | Obkircher | |
| 4,684,448 A | 8/1987 | Itoh et al. | |
| 4,701,214 A | 10/1987 | Kaneko et al. | |
| 4,718,643 A | 1/1988 | Gitman | |
| 4,786,321 A | 11/1988 | Hoster et al. | |
| 4,790,516 A | 12/1988 | Sugiura et al. | |
| 4,792,352 A | * 12/1988 | Ozeki et al. | 75/503 |
| 4,798,624 A | 1/1989 | Brotzmann et al. | |
| 4,804,408 A | 2/1989 | Puhringer | |
| 4,849,015 A | 7/1989 | Fassbinder et al. | |
| 4,861,368 A | 8/1989 | Brotzmann et al. | |
| 4,874,427 A | 10/1989 | Hamada et al. | |
| 4,890,562 A | 1/1990 | Gitman | |
| 4,913,734 A | 4/1990 | Romenets et al. | |
| 4,923,391 A | 5/1990 | Gitman | |
| 4,940,448 A | 7/1990 | Maeda et al. | |
| 4,940,488 A | 7/1990 | Maeda et al. | |
| 4,946,498 A | 8/1990 | Weber | |
| RE33,464 E | 11/1990 | Gitman | |
| 4,976,776 A | 12/1990 | Elvander et al. | |
| 4,999,097 A | 3/1991 | Sadoway | |
| 5,005,493 A | 4/1991 | Gitman | |
| 5,024,737 A | 6/1991 | Claus et al. | |
| 5,037,608 A | 8/1991 | Tarcy et al. | |
| 5,042,964 A | 8/1991 | Gitman | |
| 5,050,848 A | 9/1991 | Hardie et al. | |
| 5,051,127 A | 9/1991 | Hardie et al. | |
| 5,065,985 A | 11/1991 | Takahashi et al. | |
| 5,177,304 A | 1/1993 | Nagel | |
| 5,191,154 A | 3/1993 | Nagel | |
| 5,222,448 A | 6/1993 | Morgenthaler et al. | |
| 5,238,646 A | 8/1993 | Tarcy et al. | |
| 5,271,341 A | 12/1993 | Wagner | |
| 5,279,715 A | 1/1994 | La Camera et al. | |
| 5,301,620 A | 4/1994 | Nagel et al. | |
| 5,302,184 A | 4/1994 | Batterham et al. | |
| 5,322,547 A | 6/1994 | Nagel et al. | |
| 5,332,199 A | 7/1994 | Knapp et al. | |
| 5,333,558 A | 8/1994 | Lees, Jr. | |
| 5,396,850 A | 3/1995 | Conochie et al. | |
| 5,401,295 A | 3/1995 | Brotzmann | |
| 5,407,461 A | 4/1995 | Hardie et al. | |
| 5,415,742 A | 5/1995 | La Camera et al. | |
| 5,443,572 A | 8/1995 | Wilkison et al. | |
| 5,480,473 A | 1/1996 | Hardie et al. | |
| 5,489,325 A | 2/1996 | Keogh et al. | |
| 5,498,277 A | 3/1996 | Floyd et al. | |
| 5,518,523 A | 5/1996 | Brotzmann | |
| 5,529,599 A | 6/1996 | Calderon | |
| 5,613,997 A | 3/1997 | Satchell, Jr. | |
| 5,630,862 A | 5/1997 | Greenwalt | |
| 5,640,708 A | 6/1997 | Conochie et al. | |
| 5,647,888 A | 7/1997 | Keogh et al. | |
| 5,683,489 A | 11/1997 | Hayashi et al. | |
| 5,741,349 A | 4/1998 | Hubble et al. | |
| 5,800,592 A | 9/1998 | den Hartog et al. | |
| 5,802,097 A | 9/1998 | Genishi et al. | |
| 5,869,018 A | 2/1999 | Stephens, Jr. | |
| 5,871,560 A | 2/1999 | Fluch et al. | |
| 5,938,815 A | 8/1999 | Satchell, Jr. | |

FOREIGN PATENT DOCUMENTS

| | | |
|---|---|---|
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 0 326 402 | 8/1989 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| WO | WO 98/27239 | 6/1988 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 97/27338 | 7/1997 |
| WO | WO 97/35038 | 9/1997 |
| WO | WO 98/27232 | 6/1998 |
| WO | WO 99/16911 | 4/1999 |
| WO | WO 00-01854 | 1/2000 |

OTHER PUBLICATIONS

U.S. patent application Ser. No. 09/331,272, Bates, filed Jun. 17, 1999.

U.S. patent application Ser. No. 09/509,314, Bates, filed Mar. 21, 2000.

U.S. patent application Ser. No. 09/535,665, Leigh, filed Mar. 21, 2000.

U.S. patent application Ser. No. 09/462,282, McCarthy, filed Mar. 16, 2000.

U.S. patent application Ser. No. 09/478,750, Dry, filed Jan. 6, 2000.

U.S. patent application Ser. No. 09/509,286, MCarthy, filed Mar. 21, 2000.

U.S. patent application Ser. No. 09/509,264, Dry, filed Mar. 21, 2000.

U.S. patent application Ser. No. 09/509,290, Dry, field Mar. 21, 2000.

U.S. patent application Ser. No. 09/509,323, Dry, filed Mar. 21, 2000.

U.S. patent application Ser. No. 09/587,774, Bates, filed Jun. 6, 2000.

U.S. patent application Ser. No. 09/611,514, Bates, filed Jul. 7, 2000.

U.S. patent application Ser. No. 09/632,730, Dry, filed Aug. 4, 2000.

U.S. patent application Ser. No. 09/634,059, Burke, filed Aug. 9, 2000.
U.S. patent application Ser. No. 09/669,397, Batterham, filed Sep. 26, 2000.
U.S. patent application Ser. No. 09/685,488, Burke, filed Oct. 10, 2000.
U.S. patent application Ser. No. 09/692,821, Dry, filed Oct. 12, 2000.
Patent Abstract of Japan, JP, A, 10–280020 (Nippon Seat Corp.), Oct. 20,1998.
Patent Abstracts of Japan, C–951, p. 24, JP, A, 04–063218 (Kawasaki Heavy Ind. Ltd), Feb. 28, 1992.
Patent Abstracts of Japan, C–627, p. 109, Jp, A, 01–127613 (Kawasaki Steel Corp.), May 19, 1989.

WPAT print–out for Brazilian patent application PI9400123–5 (Weber), No Month, No Year.
Patent Abstracts of Japan, C–951, JP, A, 4–63217 (Kawasaki Heavy Ind. Ltd.), Feb. 28, 1992.
Patent abstracts of Japan, C–497, p. 115, JP, A, 62–280315 (Nippon Kokan K.K.), Dec. 15,1987.
Derwent Abstract Accession No. 87–039748/06 Class Q77, JP, A, 61–295334, Dec. 26, 1986.
Patent Abstract of Japan, JP, A, 10–280020 (Nippon Steel Corp.), Oct. 20, 1998.
International Search Report PCT/AU00/00938 No Month, No Year.

* cited by examiner

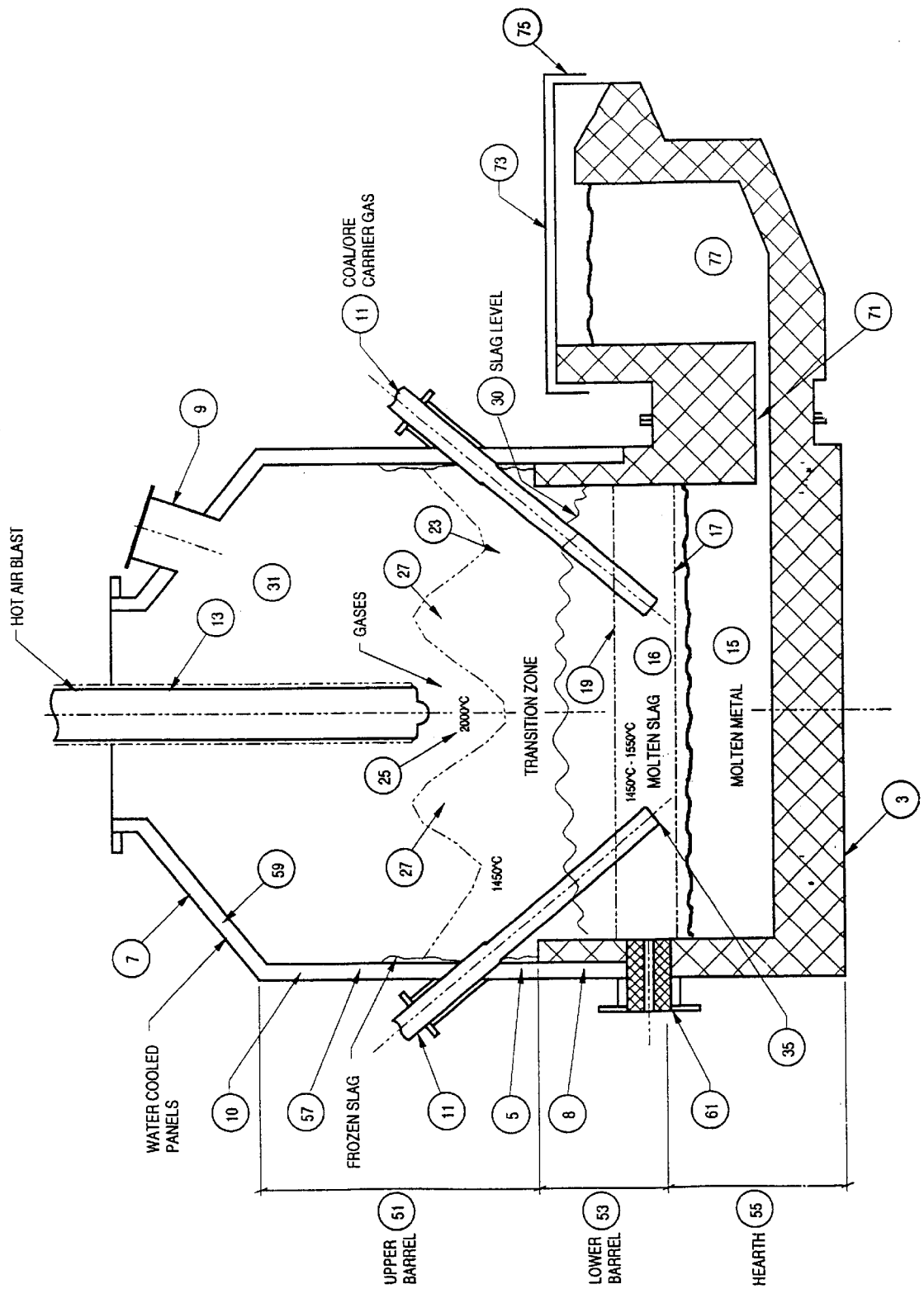

START-UP PROCEDURE FOR DIRECT SMELTING PROCESS

The present invention relates to a process for producing molten iron from a metalliferous feed material, such as ores, partly reduced ores, and metal-containing waste streams, in a metallurgical vessel containing a molten bath.

The present invention relates particularly to a molten bath-based direct smelting process for producing molten iron from a metalliferous feed material.

The term "direct smelting process" is understood to mean a process that produces a molten metal, in this case iron, from a metalliferous feed material.

The present invention relates more particularly to a molten bath-based direct smelting process which relies on a molten metal layer as a smelting medium, and is generally referred to as the HIsmelt process.

The HIsmelt process includes the steps of:
 (a) forming a molten bath having a metal layer and a slag layer on the metal layer in a metallurgical vessel;
 (b) injecting metalliferous feed material and solid carbonaceous material into the metal layer via a plurality of lances/tuyeres;
 (c) smelting metalliferous material to metal in the metal layer;
 (d) causing molten material to be projected as splashes, droplets, and streams into a space above a nominal quiescent surface of the molten bath to form a transition zone; and
 (e) injecting an oxygen-containing gas into the vessel via one or more than one lance/tuyere to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone.

A preferred form of the HIsmelt process is characterized by forming the transition zone by injecting carrier gas, metalliferous feed material, solid carbonaceous material and optionally fluxes into the bath through lances that extend downwardly and inwardly through side walls of the vessel so that the carrier gas and the solid material penetrate the metal layer and cause molten material to be projected from the bath.

This form of the HIsmelt process is an improvement over earlier forms of the process which form the transition zone by bottom injection of carrier gas and solid carbonaceous material through tuyeres into the bath which causes droplets and splashes and streams of molten material to be projected from the bath.

The applicant has carried out extensive pilot plant work on the HIsmelt process and has made a series of significant findings in relation to the process.

One of the findings, which is the subject of the present invention, is a procedure for starting up the HIsmelt process in an effective and efficient manner.

In general terms, the present invention is a procedure for starting up a direct smelting process for producing iron from a metalliferous feed material in a metallurgical vessel, which vessel includes a plurality of feed material injection lances/tuyeres, which start-up procedure includes the steps of:
 (a) preheating the vessel;
 (b) supplying a charge of molten iron to the vessel and forming a molten bath in the vessel,
 (c) supplying carbonaceous material and flux to the molten bath and injecting oxygen-containing gas through one or more than one feed material injection lance/tuyere and combusting carbon and bath derived gas (if present) and thereby heating the molten bath and generating slag; and
 (d) suppling metalliferous feed material to the vessel while continuing supply of carbonaceous material and flux and injection of oxygen-containing gas and smelting metalliferous feed material and producing molten iron and thereby completing the start-up procedure.

Preferably step (a) of preheating the vessel includes combusting fuel gas and air in the vessel. The term "fuel gas" is understood herein to include, by way of example only, coke ovens gas, blast furnace gas, and natural gas.

Preferably supply of carbonaceous material and/or flux in step (c) is via one or more than one feed material injection lance/tuyere.

Preferably supply of metalliferous feed material in step (d) is via one or more than one feed material injection lance/tuyere.

Preferably solids, ie any one or more of metalliferous feed material, carbonaceous material and flux, that are supplied via one or more than one feed material injection lance/tuyere are injected through the lance(s)/tuyere(s) with carrier gas.

The solids injection lance(s)/tuyere(s) may be movable during the course of the start-up procedure between lowered operative positions and raised retracted positions.

Alternatively, the solids injection lance(s)/tuyere(s) may be fixed during the start-up procedure and, by way of example, may extend through side walls of the vessel.

In a situation where the solids injection lance(s)/tuyere(s) are fixed, preferably step (b) includes injecting carrier gas without solids through the solids injection lance(s)/tuyere(s) at a flow rate that prevents molten metal penetrating the lance(s)/tuyere(s).

Preferably the start-up procedure includes an intermediate step between steps (b) and (c) of injecting oxygen-containing gas through one or more than one feed material injection lance/tuyere before commencing feed of carbonaceous material and flux in step (c) in order to combust oxidisable material in the molten bath and thereby increase the temperature of the bath.

Preferably step (d) of supplying metalliferous feed material commences when prescribed process conditions reach a predetermined threshold. Prescribed process conditions include, by way of example, any one or more of:
 (i) molten bath temperature (preferably at least 1400° C.); and
 (ii) carbon concentration in the molten bath (preferably at least 4 wt %); and
 (iii) post combustion levels (preferably below a level that indicates carbon saturation of the molten bath).

Preferably the vessel includes a forehearth and step (b) of supplying the charge of molten iron to the vessel includes supplying the charge via the forehearth.

Preferably pre-heating step (a) includes positioning a lid on the forehearth to minimise heat loss via the forehearth.

Preferably the start-up procedure includes cleaning the vessel prior to pre-heating step (a) to remove slag from the vessel.

Preferably the vessel includes water cooled panels that form at least part of side walls of the vessel and the start-up procedure includes spraying a castable refractory material onto the panels prior to pre-heating step (a) to reduce initial heat loss from the panels during the start-up procedure.

Preferably the castable refractory material is a high alumina spinel.

Preferably the start-up procedure includes connecting extensions to the ends of the solids injection lances/tuyeres prior to pre-heating step (a) to increase the effectiveness of solids injection during the start-up procedure when the level of the molten bath is relatively low. The extensions are made preferably from material which melts in the molten bath as the level of the molten bath increases and progressively submerges the extensions.

Preferably the molten iron supplied in step (b) includes at least 3 wt % carbon.

Preferably the molten iron supplied in step (b) includes silicon and/or aluminium and/or any other suitable like oxidisable material.

Preferably step (c) and the intermediate step between steps (b) and (c) includes injecting carrier gas at a pressure of at least 100 kPa over that in the vessel—as measured across the solids injection lances/tuyeres.

Preferably the start-up procedure includes increasing the flow rate of oxygen-containing gas during each of steps (c) and (d).

Preferably, step (c) includes injecting oxygen-containing gas through one or more than one feed material injection lance/tuyere at a flow rate of at least 12,000 $Nm^3/hr$.

Preferably step (d) includes injecting oxygen-containing gas at a flow rate of at least 20,000 $Nm^3/hr$.

Preferably the start-up procedure includes determining the time period for step (c) by monitoring the oxygen and/or carbon monoxide and/or carbon dioxide concentrations in off-gas from the vessel.

Preferably the start-up procedure includes determining the time period for the intermediate step between steps (b) and (c) by monitoring the oxygen and/or carbon monoxide and/or carbon dioxide concentrations in off-gas from the vessel.

Preferably the start-up procedure includes increasing the pressure in the vessel during step (c).

Slag material, including possibly slag material from a previous operation of the vessel, may be supplied to the vessel during step (c) to help minimise excessive oxidation of iron in the molten bath during step (c) by building up a slag layer on the bath.

Preferably slag material is supplied via one or more than one feed material injection lance/tuyere.

The metalliferous feed material may be any suitable iron-containing feed material. The preferred feed material is iron ore.

The iron ore may be pre-heated.

The iron ore may be partially reduced.

In some situations, such as where the vessel is subject to high heat losses, the metalliferous feed material may be a blend of iron ore and a highly reduced metalliferous feed material. In that event, preferably the start-up procedure includes the steps of reducing the amount of the highly reduced metalliferous feed material supplied to the molten bath, replacing this metalliferous feed material with iron ore, and continuing oxygen-containing gas injection and reaching steady-state process conditions.

The term "steady-state process conditions" is understood to mean that the process operates with a target feed metalliferous material and within target heat and mass balances.

The above definition is understood in the context that the HIsmelt process relies on significant agitation of molten material in the vessel and, as a consequence, the process can be subject to considerable short term fluctuations.

Preferably the highly reduced metalliferous feed material injected in step (d) is at least 60% metallised.

More preferably the highly reduced metalliferous feed material is direct reduced iron ("DRI").

Preferably the oxygen-containing gas is air with up to 50 vol % oxygen.

According to the present invention there is also provided a direct smelting process which includes the above-described start-up procedure.

The present invention is described further by way of example with reference to the accompanying drawing which is a vertical section through a preferred form of a direct smelting vessel for carrying out the HIsmelt process for direct smelting iron ore to produce molten iron.

The vessel shown in the figure has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 77 for discharging molten metal continuously; a forehearth connection 71 that interconnects the hearth and the forehearth 77; and a tap-hole 61 for discharging molten slag.

In use, under steady-state process conditions, the vessel contains a molten bath of iron and slag which includes a layer 15 of molten metal and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The term "quiescent surface" is understood to mean the surface when there is no injection of gas and solids into the vessel.

The vessel also includes two feed material injection lances/tuyeres in the form of solids injection lances/tuyeres 11 extending downwardly and inwardly at an angle of 30–60° to the vertical through the side walls 5 and into the slag layer 16. The position of the lances/tuyeres 11 is selected so that the lower ends are above the quiescent surface 17 of the metal layer 15 under steady-state process conditions.

In use, under steady-state process conditions iron ore, solid carbonaceous material (typically coal), and fluxes (typically lime and magnesia) entrained in a carrier gas (typically $N_2$) are injected into the metal layer 15 via the lances/tuyeres 11. The momentum of the solid material/carrier gas causes the solid material and gas to penetrate the metal layer 15. The coal is devolatilised and thereby produces gas in the metal layer 15. Carbon partially dissolves into the metal and partially remains as solid carbon. The iron ore is smelted to metal and the smelting reaction generates carbon monoxide gas. The gases transported into the metal layer 15 and generated via devolatilisation and smelting produce significant buoyancy uplift of molten metal, solid carbon, and slag (drawn into the metal layer 15 as a consequence of solid/gas/injection) from the metal layer 15 which generates an upward movement of splashes, droplets and streams of molten metal and slag, and these splashes, and droplets, and streams entrain slag as they move through the slag layer 16.

The buoyancy uplift of molten metal, solid carbon and slag causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of the order of 30°.

In addition, the upward movement of splashes, droplets and streams of molten metal and slag caused by the buoyancy uplift of molten metal, solid carbon, and slag extends into the top space 31 above the molten material in the vessel and:

(a) forms a transition zone 23; and
(b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten metal and slag.

The vessel further includes a further feed material injection/lance tuyere in the form of a lance 13 for injecting an oxygen-containing gas (typically pre-heated oxygen enriched air) which is centrally located and extends vertically downwardly into the vessel. The position of the lance 13 and the gas flow rate through the lance 13 are selected so that under steady-state process conditions the oxygen-containing gas penetrates the central region of the transition zone 23 and maintains an essentially metal/slag free space 25 around the end of the lance 13.

In use, under steady-state process conditions, the injection of the oxygen-containing gas via the lance 13 post-combusts reaction gases CO and $H_2$ in the transition zone 23 and in the free space 25 around the end of the lance 13 and generates high temperatures of the order of 2000° C. or higher in the gas space. The heat is transferred to the ascending and descending splashes droplets, and streams, of molten material in the region of gas injection and the heat is then partially transferred to the metal layer 15 when the molten material returns to the molten bath.

The free space 25 is important to achieving high levels of post combustion because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten metal and slag is to shape the transition zone 23 around the lower region of the lance 13—generally identified by the numerals 27. This shaped region provides a partial barrier to heat transfer by radiation to the side walls 5.

Moreover, under steady-state process conditions, the ascending and descending droplets, splashes and streams of metal and slag is an effective means of transferring heat from the transition zone 23 to the molten bath with the result that the temperature of the transition zone 23 in the region of the side walls 5 is of the order of 1450° C.–1550° C.

The vessel is constructed with reference to the levels of the metal layer 15, the slag layer 16, and the transition zone 23 in the vessel when the process is operating under steady-state process conditions and with reference to splashes, droplets and streams of molten metal and slag that are projected into the top space 31 above the transition zone 23 when the process is operating under steady-state operating conditions, so that:
(a) the hearth and the lower barrel section 53 of the side walls 5 that contact the metal/slag layers 15/16 are formed from bricks of refractory material (indicated by the cross-hatching in the figure);
(b) at least part of the lower barrel section 53 of the side walls 5 is backed by water cooled panels 8; and
(c) the upper barrel section 51 of the side walls 5 and the roof 7 that contact the transition zone 23 and the top space 31 are formed from water cooled panels 57, 59.

Each water cooled panel 8, 57, 59 in the upper barrel section 51 of the side walls 5 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent straight sections of each pipe and between the pipes. Each panel further includes a support plate which forms an outer surface of the panel.

The water inlets and the water outlets of the pipes are connected to a water supply circuit (not shown) which circulates water at high flow rate through the pipes.

The pilot plant work referred to above was carried out as a series of extended campaigns by the applicant at its pilot plant at Kwinana, Western Australia.

The pilot plant work was carried out with the vessel shown in the figure and described above and in accordance with the steady-state process conditions described above.

The pilot plant work evaluated the vessel and investigated the process under a wide range of different:
(a) feed materials;
(b) solids and gas injection rates;
(c) slag inventories—measured in terms of the depth of the slag layer and the slag:metal ratios;
(d) operating temperatures; and
(e) apparatus set-ups.

The pilot plant work established a preferred start-up procedure that worked effectively and efficiently. The preferred start-up procedure is summarised below.
(1) Clean the vessel to remove slag from the hearth, side walls 5, and roof 7 that was deposited in a previous campaign. The removal of slag is important because of potential safety issues that could arise during start-up if molten slag is projected into and from the forehearth 77. After cleaning the vessel, spray a high alumina spinel onto the water cooled panels to reduce heat loss via the panels during the start-up procedure. Prior to or after the preceding step, bolt or otherwise attach extensions (not shown) onto the solids injection lances/tuyeres 11 to increase the effective length of the lances/tuyeres during the start-up procedure while the level of molten material in the vessel is relatively low. The extensions are formed from stainless steel or any other suitable material which will melt in the molten bath as the bath level increases and submerges the extensions.
(2) Preheat the vessel.

One preferred preheating option is to combust fuel gas and air in the vessel. In practice, it is preferable to limit the preheating temperature to 1400° C. because flame temperatures to generate this preheating temperature are considerably higher and could cause damage to refractories in the vessel. In order to improve heat transfer efficiency a lid 73 and a downwardly-extending cover plate 75 are positioned on the forehearth 77.

Another preferred heating option, in situations when hot stoves are available, is to preheat by blowing air through lance 13 and progressively increasing the amount of air that has been preheated using the stoves until all the air comes via the stoves and then supplementing the preheat over the last 400° C. with the use of a fuel burner as previously described.

(3) Prepare 40–45 tonne charge of molten iron which includes 4 wt % carbon, 0.75 wt % silicon and 0.5 wt % aluminium and is at an average temperature of 1360° C.

(4) Stop the preheating step and deliver the charge of molten iron to the vessel via the forehearth 77 and inject nitrogen (or other suitable carrier gas) through the lances/tuyeres 11 into the vessel at a pressure of at least 100 kPa over the pressure in the vessel and thereby prevent penetration of molten material into the lances/tuyeres 11;

(5) After delivering the molten iron charge, continue nitrogen injection as outlined in step (4) and inject oxygen-containing gas through the lance 13 at an initial flow rate of 12,000 $Nm^3$/hr—increasing to 20,000 $Nm^3$/hr (the minimum flow rate required for solids injection)—to combust silicon and aluminium and decarburise the molten iron charge and generate carbon monoxide/carbon dioxide and thereby heat the molten iron bath. Simultaneously, increase the pressure in the vessel to that of the minimum pressure required to inject solids (typically 20 kPa) Typically the time required for this step is 5–10 minutes.

(6) After oxygen-containing gas injection has stabilised at 20,000 $Nm^3$/hr, commence coal and flux (typically lime) injection via the lances/tuyeres 11 at an initial coal flow rate of 3 tonne/hr and commence monitoring oxygen and/or CO and/or and $CO_2$ content in off-gas to determine whether the bath is reacting. A decrease in oxygen content and an increase in CO and $CO_2$ content indicates that the bath is reacting. When this trend is established the coal and oxygen-containing gas flow rates can be increased from the initial flow rates. The objectives of this step are (a) to increase the temperature and carbon content of the molten iron as quickly as possible to a minimum molten iron temperature of 1450° C. and minimum carbon content of 4.5 wt %, (b) to form slag having a required basicity, and (c) begin to establish transition zone 23. During this step there are very high heat loads on the water cooled panels. The oxygen-containing gas flow rate is increased to 28,000 $Nm^3$/hr. This has the effect of increasing the pressure in the vessel to 70–75 kPa. Typically, this step runs for 30 minutes.

(7) After the molten iron temperature reaches the minimum temperature of 1450° C. and minimum carbon content of 4.5 wt %, commence injection of a blend of iron ore fines and DRI through the lances/tuyeres 11 at an initial flow rate of 6 tonnes/hr while continuing injection of coal and flux and smelt the blend and produce molten iron flow from the forehearth and generate post-combustion and heat transfer to the bath via the transition zone 23. After the post combustion levels start to increase the heat loads on panels start to decrease and the blend flow rate can be increased.

(8) With time, progressively the DRI can be replaced with partially reduced iron ore or iron ore until such time as target feed material is the only metalliferous feed material and the process is in steady-state mode.

(9) After 2–3 hours of operation, tap the vessel and obtain a sample of slag and determine process conditions.

The initial injection of the blend of iron ore fines and DRI in step (7) above is a function of vessel size and heat losses. In the case of the pilot plant, there were very large heat losses in the start-up phase and the addition of DRI was necessary to establish metal production. In larger commercial size vessels it is thought that heat losses may not be as serious an issue and DRI addition may not be necessary.

Many modifications may be made to the preferred embodiments of the process of the present invention as described above without departing from the spirit and scope of the present invention.

What is claimed is:

1. A procedure for starting up a direct smelting process for producing iron from a metalliferous feed material in a metallurgical vessel, the vessel including a plurality of feed material injection lances/tuyeres, the start-up procedure comprising:
   (a) preheating the vessel by combusting fuel gas and air in the vessel;
   (b) supplying a charge of molten iron to the vessel and forming a molten bath in the vessel;
   (c) supplying carbonaceous material and flux to the molten bath and injecting oxygen-containing gas through one or more than one feed material injection lance/tuyere and combusting carbon and bath derived gas and thereby heating the molten bath and generating slag; and
   (d) when prescribed conditions including any one or more of molten bath temperature, carbon concentration in the molten bath, and post combustion levels reach a predetermined threshold, supplying metalliferous feed material to the vessel while continuing supply of carbonaceous material and flux and injection of oxygen-containing gas and smelting metalliferous feed material and producing additional molten iron.

2. The start-up procedure defined in claim 1 wherein step (c) includes supplying carbonaceous material and flux by injecting the carbonaceous material and flux through one or more than one feed material injection lance/tuyere.

3. The start-up procedure defined in claim 2 wherein step (d) includes supplying metalliferous feed material by injecting the feed material through one or more than one feed material injection lance/tuyere.

4. The start-up procedure defined in claim 2 including injecting one or more of carbonaceous material, flux, and metalliferous feed material with carrier gas through one or more than one feed material injection lance/tuyere.

5. The start-up procedure defined in claim 1 between steps (b) and (c) including injecting oxygen-containing gas through one or more than one feed material injection lance/tuyere before commencing supply of carbonaceous material and flux in step (c) in order to combust oxidizable material in the molten bath to increase the temperature of the bath.

6. The start-up procedure defined in claim 1 wherein the vessel includes a forehearth and step (b) includes supplying the charge via the forehearth.

7. The start-up procedure defined in claim 6 wherein pre-heating step (a) includes positioning a lid on the forehearth to minimize heat loss via the forehearth.

8. The start-up procedure defined in claim 1 including cleaning the vessel prior to step (a) to remove slag that remained in the vessel at the conclusion of a previous run of the direct smelting process.

9. The start-up procedure defined in claim 1 wherein the vessel includes water cooled panels that form at least part of side walls of the vessel and the start-up procedure includes spraying a castable refractory material onto the panels prior to step (a) to reduce initial heat loss from the panels during the start-up procedure.

10. The start-up procedure defined in claim 1 wherein the molten iron supplied in step (b) includes at least 3 wt % carbon.

11. The start-up procedure defined in claim 1 wherein the molten iron supplied in step (b) includes silicon and/or aluminium and/or any other suitable oxidizable material.

12. The start-up procedure defined in claim 2 wherein step (c) includes injecting carrier gas at a pressure of at least 100 kPa over the pressure in the vessel with the injected carbonaceous material and flux.

13. The start-up procedure defined in claim 1 including increasing the flow rate of oxygen-containing gas during each of steps (e) and (d).

14. The start-up procedure defined in claim 13 including injecting oxygen-containing gas at a flow rate of at least 12,000 Nm$^3$/hr in step (c).

15. The start-up procedure defined in claim 13 including injecting oxygen-containing gas at a flow rate of at least 20,000 Nm$^3$/hr in step (d).

16. The start-up procedure defined in claim 1 including determining the time period for step (c) by monitoring the oxygen and/or carbon monoxide and/or carbon dioxide concentrations in off-gas from the vessel.

17. The start-up procedure defined in claim 1 including increasing the pressure in the vessel during step (c).

18. The start-up procedure defined in claim 1 wherein the metalliferous feed material comprises a blend of iron ore and a highly reduced metalliferous feed material, and the start up procedure further includes: reducing the amount of the highly reduced metalliferous feed material supplied to the molten bath over a period of time, replacing the highly reduced metalliferous feed material with iron ore, and continuing oxygen-containing gas injection and reaching steady-state process conditions.

19. The start-up procedure defined in claim 18 wherein the highly reduced metalliferous feed material injected in step (e) is at least 60% metallized.

20. The start-up procedure defined in claim 19 wherein the highly reduced metalliferous feed material is direct reduced iron.

21. A procedure for stating up a direct smelting process for producing iron from a metalliferous feed material in a metallurgical vessel, the vessel including a plurality of feed material injection lances/tuyeres and a forehearth, the start-up procedure comprising:

(a) preheating the vessel, the preheating step including positioning a lid on the forehearth to minimize heat loss via the forehearth;

(b) supplying a charge of molten iron to the vessel via the forehearth and forming a molten bath in the vessel;

(c) supplying carbonaceous material and flux to the molten bath and injecting oxygen-containing gas through one or more than one feed material injection lance/tuyere and combusting carbon and bath derived gas and thereby heating the molten bath and generating slag; and (d) supplying metalliferous feed material to the vessel while continuing supply of carbonaceous material and flux and injection of oxygen-containing gas and smelting metalliferous feed material and producing additional molten iron.

22. A procedure for starting up a direct smelting process for producing iron from a metalliferous feed material in a metallurgical vessel, the vessel including a plurality of feed material injection lances/tuyeres, the start-up procedure comprising:

(a) preheating the vessel;

(b) supplying a charge of molten iron to the vessel and forming a molten bath in the vessel;

(c) injecting carbonaceous material, flux, and carrier gas into the molten bath through one or more than one feed material injection lance/tuyere with the carrier gas being at a pressure of at least 100 kPa over the pressure in the vessel, and injecting oxygen-containing gas through one or more than one feed material injection lance/tuyere and combusting carbon and bath derived gas and thereby heating the molten bath and generating slag; and (d) supplying metalliferous feed material to the vessel while continuing supply of carbonaceous material and flux and injection of oxygen-containing gas and smelting metalliferous feed material and producing additional molten iron.

23. A procedure for starting up a direct smelting process for producing iron from a metalliferous feed maternal in a metallurgical vessel, the vessel including a plurality of feed material injection lances/tuyeres, the start-up procedure comprising:

(a) preheating the vessel by combusting fuel gas and air in the vessel;

(b) supplying a charge of molten iron to the vessel and forming a molten bath in the vessel;

(c) injecting oxygen-containing gas through one or more than one feed material injection lance/tuyere in order to combust oxidizable material in the molten bath to increase the temperature of the bath;

(d) supplying carbonaceous material and flux to the molten bath and injecting oxygen-containing gas through one or more than one feed material injection lance/tuyere and combusting carbon and bath derived gas and thereby heating the molten bath and generation slag; and (e) supplying metalliferous feed material to the vessel while continuing supply of carbonaceous material and flux and injection of oxygen-containing gas and smelting metalliferous feed material and producing additional molten iron.

24. The start-up procedure defined in claim 23 wherein the molten iron supplied in step (b) includes silicon and/or aluminum and/or any other suitable oxidizable material.

* * * * *